(12) United States Patent
Yen

(10) Patent No.: US 6,899,060 B1
(45) Date of Patent: May 31, 2005

(54) COLLAR FOR PETS

(75) Inventor: Li Chu Yen, Changhua Hsien (TW)

(73) Assignee: Chii Shuenn Enterprise Co., Ltd., Changhua Hsien (TW)

(*) Notice: Subject to any disclaimer, the term of this patent is extended or adjusted under 35 U.S.C. 154(b) by 0 days.

(21) Appl. No.: 10/766,810

(22) Filed: Jan. 30, 2004

(51) Int. Cl.[7] .......................................... A01K 27/00
(52) U.S. Cl. ................................................ 119/863
(58) Field of Search .................... 119/792, 856, 863, 119/864

(56) References Cited

U.S. PATENT DOCUMENTS

| | | | | |
|---|---|---|---|---|
| 5,325,819 A | * | 7/1994 | Krauss | 119/792 |
| 5,383,426 A | * | 1/1995 | Krauss | 119/793 |
| 6,129,055 A | * | 10/2000 | Hanada | 119/863 |
| 6,213,057 B1 | * | 4/2001 | Franco et al. | 119/793 |

* cited by examiner

Primary Examiner—Robert P. Swiatek
(74) Attorney, Agent, or Firm—Troxell Law Office, PLLC

(57) ABSTRACT

A collar for pets includes an adjustment belt and a neck belt wherein the adjustment belt has a plurality of engagement holes equidistantly distributed at the surface of one side thereon, and the neck belt is provided with an engaging hoop attached at one side thereto. At the other side of the adjustment belt and the neck belt are respectively disposed a first and a second coupling hoops with a first and a second movable coupling belts attached at the other side of the coupling hoops thereof. The first/second movable coupling belts are respectively provided with a D-shaped first/second leash hoops at the outer side of the other end thereof, and a first/second passages disposed at the middle section thereon for holding a male and female buckle pieces with elastic buckling legs and buckling holes disposed thereon respectively. Thus, the collar thereof is adjustably looped around the neck of a pet with the D-shaped first/second leash hoops guarded at the front outer side of the male and female buckle pieces before the leash hoops thereof hitched to a hook of a leash to form two layers of retaining points for double buckling safety. In case the male and female buckle pieces are mutually disengaged due to the joggling or nuzzling of the pet, the hook of the leash can still hitch precisely onto the D-shaped leash hoops of the collar, effectively preventing the pet from running off instantly from the collar and getting lost.

2 Claims, 5 Drawing Sheets

COLLAR FOR PETS

BACKGROUND OF THE INVENTION

The present invention is related to a collar for pets, comprising a collar made up of an adjustment belt and a neck belt wherein the adjustment belt and the neck belt are respectively equipped with a first and a second coupling hoops with a first and a second movable coupling belts attached at the other side of the coupling hoops thereof. The first/second movable coupling belts are respectively provided with a D-shaped first/second leash hoops disposed at the outer side of the other end thereof, and a first/second passages disposed at the middle section thereon for holding a male and female buckle pieces respectively; whereby, the collar thereof is adjustably looped around the neck of a pet with the D-shaped leash hoops guarded at the front outer side of the male and female buckle pieces before the leash hoops thereof hitched to a hook of a leash to form two layers of retaining points for double buckling safety. Thus, in case the male and female buckle pieces are mutually disengaged due to the joggling or nuzzling of the pet, the hook of the leash can still hold precisely onto the D-shaped leash hoops of the collar, effectively preventing the pet from running off instantly from the collar and getting lost.

Please refer to FIGS. 1 to 2 inclusive. A conventional collar for pets is made up of a collar 10 having an adjustment belt 11 and a neck belt 12 wherein the corresponding inner side of the adjustment belt 11 and the neck belt 12, each having a D-shaped leash hoop 13 attached thereto respectively, is engaged with both sides of a coupling hoop 14, and the corresponding outer side thereof is respectively provided with a male and a female buckle pieces 15, 16 having elastic buckling legs 151 and buckling holes 161 disposed thereon respectively for mutual engagement of the male and female buckle pieces 15, 16 thereby. In practical use, the adjustment belt 11 is adjusted according to the neckline of a neck 21 of a pet 20 before the adjustment belt 11 and the neck belt 12 are looped around the neck 21 of the pet 20 thereof. The elastic buckling legs 151 and the buckling holes 161 of the male/female buckle pieces 15, 16 are then buckled up, and a hook 31 of a leash 31 is hitched to the D-shaped leash hoops 13 before the pet 20 is ready to be walked outdoors as shown in FIG. 2.

There are some drawbacks to such conventional collar for pets. Most of all, the mutually engaged male/female buckle pieces 15, 16 of the collar 10 are individually located at one lower lateral side of the neck 21 in separation from the retaining point of the leash 30. In case the elastic buckling legs 151 of the male buckle piece 15 are suddenly snapped open and detached from the buckling holes 161 of the female buckle piece 16 due to the joggling or nuzzling of the pet 20 as shown in FIG. 2, the pet 20 will instantly run off from the collar 10 which can make an embarrassing scene of running and chasing after the pet 20, or even results in the loss of the pet 20.

SUMMARY OF THE PRESENT INVENTION

It is, therefore, the primary purpose of the present invention to provide a collar for pets, comprising a collar made up of an adjustment belt and a neck belt wherein the adjustment belt and the neck belt are respectively equipped with a first and a second coupling hoops with a first and a second movable coupling belts attached at the other side of the coupling hoops thereof and a D-shaped first/second leash hoops attached at the outer side of the first/second movable coupling belts respectively; whereby, the collar thereof is adjustably looped around the neck of a pet with the D-shaped first/second leash hoops guarded at the front outer side of a male and female buckle pieces before the leash hoops thereof hitched to a hook of a leash to form two layers of retaining points for double buckling safety. Thus, in case elastic buckling legs of the male buckle piece are accidentally detached from buckling holes of the female buckle piece due to the joggling or nuzzling of the pet, the hook of the leash can still hold precisely onto the D-shaped first/second leash hoops of the collar, effectively preventing the pet from running off instantly from the collar and getting lost.

DETAILED DESCRIPTION OF THE PREFERRED EMBODIMENTS

Figure 1:
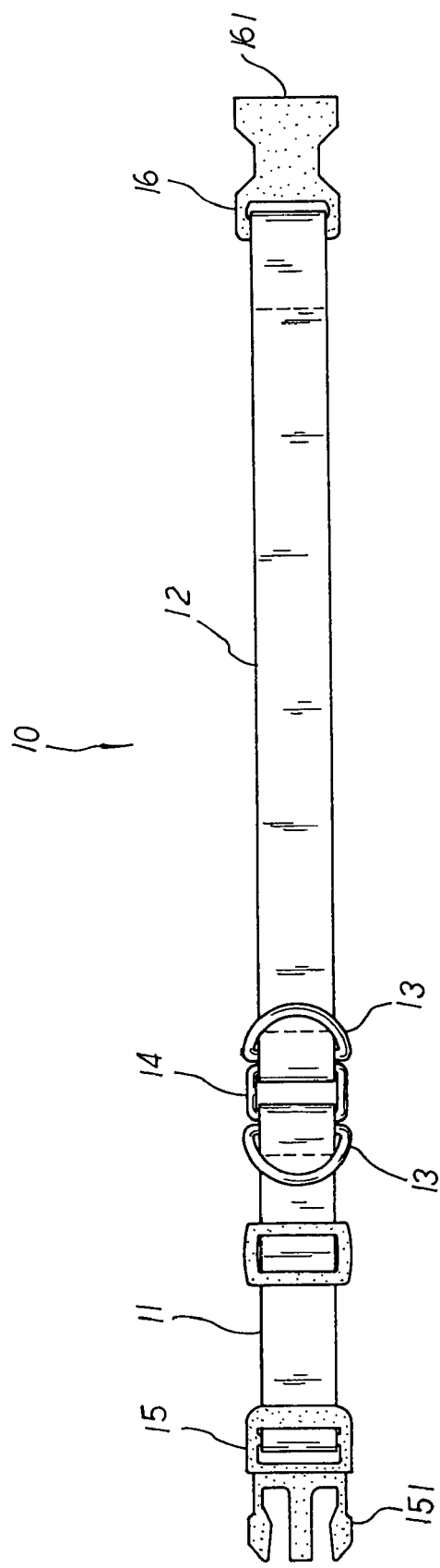
FIG. 1 is a perspective view of a conventional collar for pets.
Figure 2:
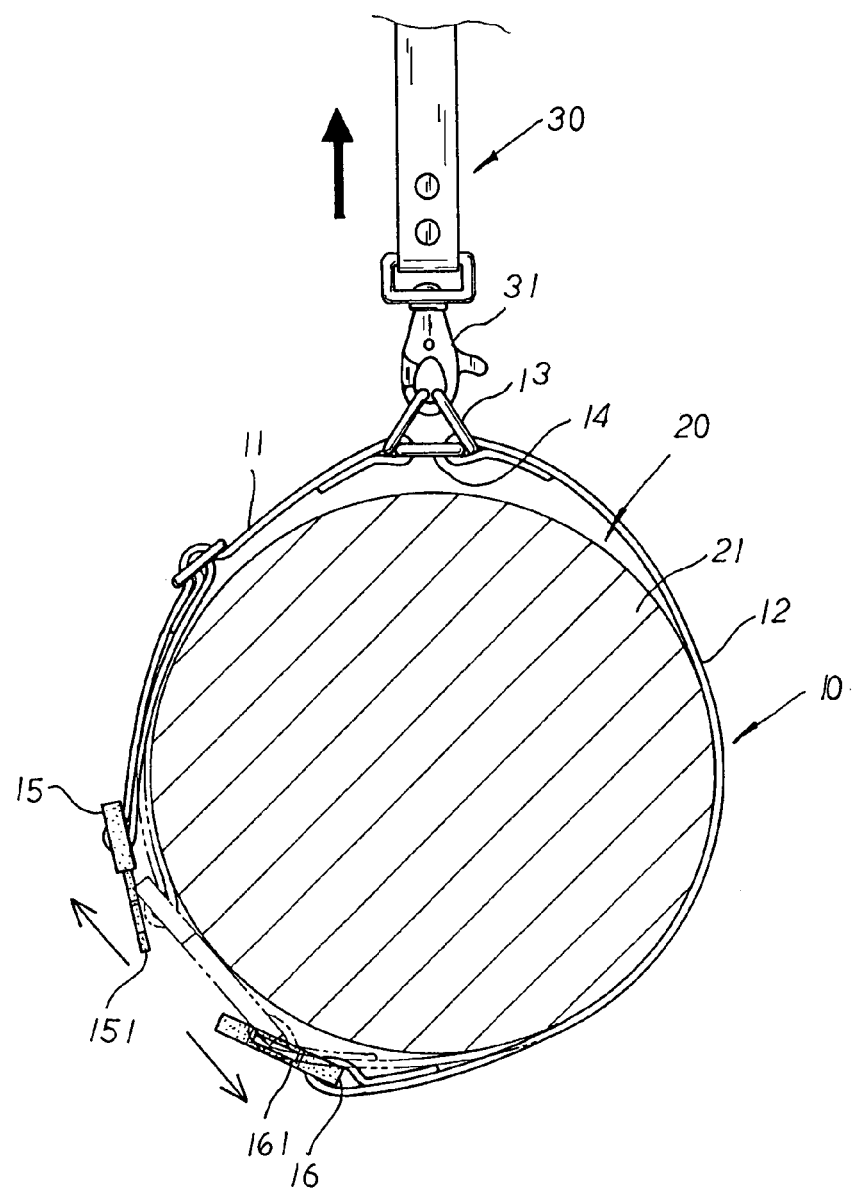
FIG. 2 is a diagram showing a conventional collar for pets getting loosened in use.
Figure 3:
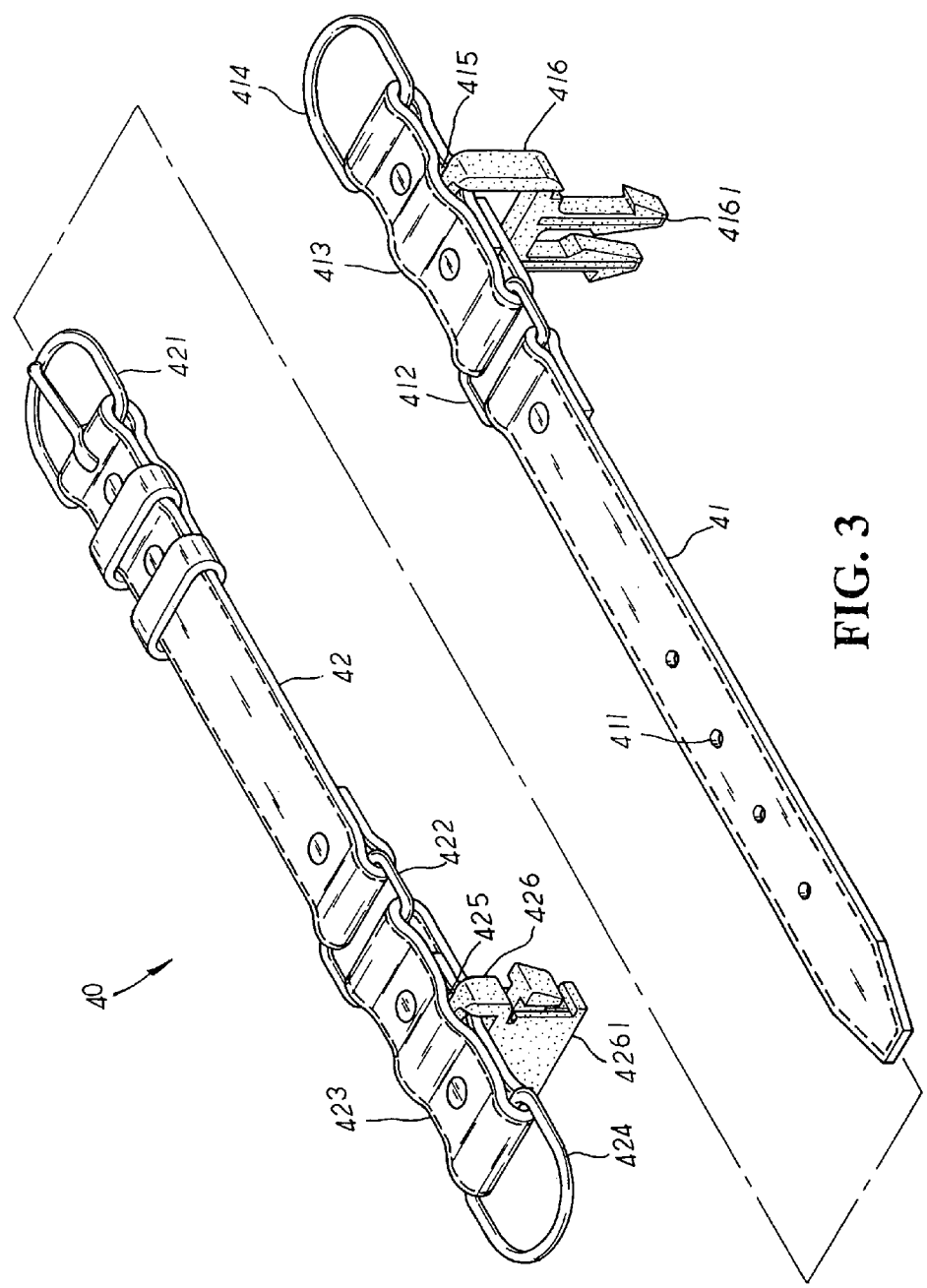
FIG. 3 is a perspective exploded view of the present invention.

Please refer to FIG. 3. The present invention is related to a collar for pets, including a collar 40 made up of an adjustment belt 41 and a neck belt 42. The adjustment belt 41 has a plurality of engagement holes 411 equidistantly distributed at the surface of one end thereon, and the neck belt 42 is provided with an engaging hoop 421 attached at one end thereto correspondingly matched to the engagement holes 411 of the adjustment belt 41 thereof. At the other ends of the adjustment belt 41 and the neck belt 42 are respectively disposed first and second coupling hoops 412, 422, and first and second movable coupling belts 413, 423 attached at the other ends of the first and the second coupling hoops 412, 422 thereto. The first and the second movable coupling belts 413, 423 are respectively provided with a D-shaped first and second leash hoops 414, 424 disposed at the outer ends of the other ends thereof, and first and second passages 415, 425 disposed at the middle section thereof for a male and female buckle pieces 416, 426 to be engaged therewith respectively. The male and female buckle pieces 416, 426 are equipped with elastic buckling legs 4161 and buckling holes 4261 respectively for mutual engagement of the male and female buckle pieces 416, 426 thereby.

Figure 4:
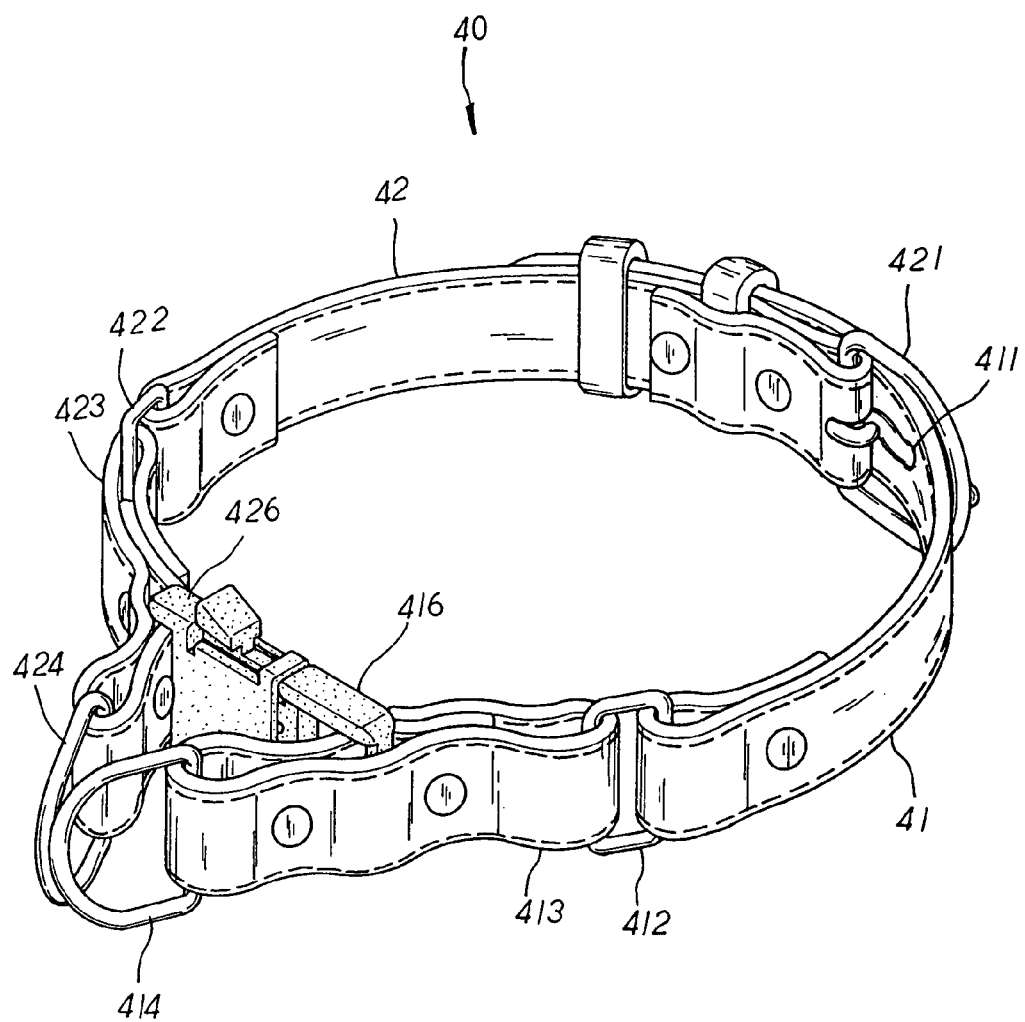
FIG. 4 is a diagram showing the present invention in assembly and in use.
Figure 5:
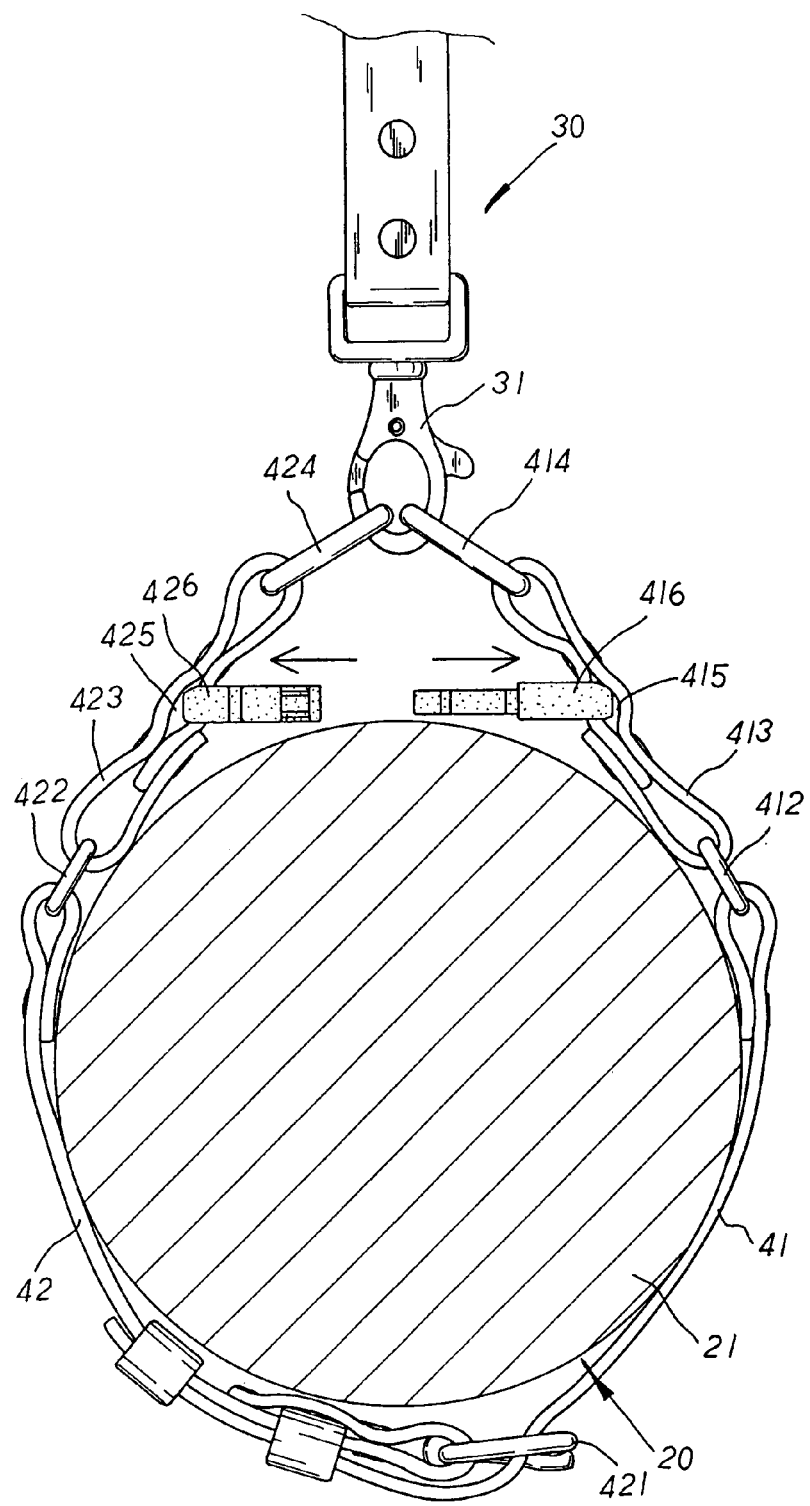
FIG. 5 is a diagram showing a male/female buckle pieces of the present invention snapped open in practical use.

Please refer to FIGS. 4 and 5 inclusive. In assembly, the male and female buckle pieces 416, 426 thereof are mutually buckled up at the rear side of a neck 21 of a pet 20 before the adjustment belt 41 and the neck belt 42 are respectively led to wind through the front side of the pet's neck 21 thereof. The other end of the adjustment belt 41 is then passed through the engaging hoop 421 of the neck belt 42 and properly adjusted to the neckline of the pet 20 before the engaging hoop 421 is securely located onto one of the engagement holes 411 of adjustment belt 41 to leash the neck 21 of the pet 20 comfortably at the collar 40 therein. The D-shaped first and second leash hoops 414, 424 are led to the front outer side of the mutually engaged male and female buckle pieces 416, 426, and a leash 30 is guided to hitch the D-shaped first and second leash hoops 414, 424 thereof via a hook 31, forming two layers of retaining points to achieve double buckling safety. In case the elastic buckling legs 4161 of the male buckle piece 416 are snapped open and detached from the buckling holes 4261 of the female buckle piece 426 due to the joggling or nuzzling of the pet 20, the D-shaped first and second leash hoops 414, 424 guarded at the front outer side of the male and female buckle pieces 416, 426 can still hold the neck 21 of the pet 20 at the collar 40 therein. Thus, the hook 31 of the leash 30 is securely hitched to the D-shaped first and second leash hoops 414, 424 with the collar 40 precisely looped around the neck 21 of the pet 20 thereof so that the pet 20 will not run off from the collar 40 instantly, effectively preventing the scene of busily chasing after the pet 20 as well as the event of carelessly losing the pet 20 thereof.

What is claimed is:

1. A collar for pets, including a collar made up of an adjustment belt and a neck belt wherein the adjustment belt has a plurality of engagement holes equidistantly distributed at the surface of one end thereof, and the neck belt is provided with an engaging hoop attached at one end thereof correspondingly matched to the engagement holes of the adjustment belt thereof; at the other ends of the adjustment belt and the neck belt are respectively disposed first and second coupling hoops; the present invention being characterized by that, the first and the second coupling hoops having first and second movable coupling belts attached at the other ends thereof respectively, and the first and second movable coupling belts being respectively provided with D-shaped first and second leash hoops disposed at the outer ends of the other ends thereof, and male and female buckle pieces disposed at middle sections thereof;

the male and female buckle pieces being equipped with elastic buckling legs and buckling holes respectively for mutual engagement of the male and female buckle pieces thereby;

thus, the collar is adjustably looped around the neck of a pet with the D-shaped first and second leash hoops located on an exterior of the collar on the front outer side of the mutually engaged male and female buckle pieces before the leash hoops thereof are hitched to a hook of a leash to form two layers of retaining points for double buckling safety; in case the elastic buckling legs of the male buckle piece are snapped open and detached from the buckling holes of the female buckle pieces due to the joggling or nuzzling of the pet, the hook of the leash can still hold precisely onto the D-shaped first and second leash hoops of the collar, effectively preventing the pet from running off instantly from the collar and getting lost.

2. The collar for pets as claimed in claim 1 wherein the first and the second coupling belts of the adjustment belt and the neck belt thereof are respectively provided with first and second passages disposed at the middle sections thereof for the male and the female buckle pieces thereof to be engaged therewith respectively.

* * * * *